United States Patent [19]
Corbalis et al.

[11] Patent Number: 5,359,592
[45] Date of Patent: Oct. 25, 1994

[54] BANDWIDTH AND CONGESTION CONTROL FOR QUEUE CHANNELS IN A CELL SWITCHING COMMUNICATION CONTROLLER

[75] Inventors: Charles M. Corbalis, Saratoga; Ross S. Heitkamp, Mountain View; Rafael Gomez, Sunnyvale, all of Calif.

[73] Assignee: Stratacom, Inc., San Jose, Calif.

[21] Appl. No.: 83,623

[22] Filed: Jun. 25, 1993

[51] Int. Cl.$^5$ .......................... H04J 3/14; H04M 3/22
[52] U.S. Cl. ......................................... 370/17; 370/60; 370/94.1; 370/118
[58] Field of Search ....................... 370/13, 17, 54, 60, 370/60.1, 79, 84, 85.2, 85.6, 85.7, 85.8, 94.1, 94.2, 95.1, 95.2, 118; 340/825.06, 825.08, 825.5, 825.51; 371/5.1, 5.5

[56] References Cited

U.S. PATENT DOCUMENTS

| | | | |
|---|---|---|---|
| 5,062,106 | 10/1991 | Yamazaki et al. | 370/60 |
| 5,119,367 | 6/1992 | Kawakatsu et al. | 370/60 |
| 5,130,978 | 7/1992 | Mobasser | 370/60 |
| 5,267,232 | 11/1993 | Katsube et al. | 370/17 |
| 5,278,830 | 1/1994 | Kudo | 370/60 |
| 5,280,483 | 1/1994 | Kamoi et al. | 370/60 |

*Primary Examiner*—Alpus H. Hsu
*Attorney, Agent, or Firm*—Blakely, Sokoloff, Taylor & Zafman

[57] ABSTRACT

A mechanism for buffering communication cells in a communication controller, wherein a cell queuing circuit provides a cell loss priority mechanism, and wherein the cell queuing circuit determines service states for queue channels according to bandwidth allocation parameters. The service states includes a serve__now state, a serve__ok state, and a no__serve state, such that a queue channel is in the serve__now state if the queue channel must be serviced to maintain a minimum information rate parameter for the queue channel, the serve__ok state if the queue channel can be serviced and not exceed a peak information rate parameter for the queue channel.

28 Claims, 14 Drawing Sheets

| SR BIT # | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| LINK REG. | x | | | NEXT BLOCK | | | | | | | x | x | x | x | x | x |

*Figure 8*

| OFFSET | BIT # | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| 0 | STATE/CONTROL | x | x | x | x | ES | QE | CS | QF | x | x | x | x | x | EE | EC | QEN |
| 1 | RESERVED | | | | | | | | | | | | | | | | |
| 2 | RESERVED | | | | | | | | | | | | | | | | |
| 3 | MAXIMUM DEPTH | | | | | | | CELL COUNT | | | | | | | | | |
| 4 | QUEUE POINTER | | | BLOCK NUMBER | | | | | | | | | OFFSET | | | | |
| 5 | SERVICE POINTER | | | BLOCK NUMBER | | | | | | | | | OFFSET | | | | |
| 6 | CELL QUEUE DEPTH | | | | | | | CELL COUNT | | | | | | | | | |
| 7 | CLP HIGH THRESHOLD | | | | | | | CELL COUNT | | | | | | | | | |
| 8 | CLP LOW THRESHOLD | | | | | | | CELL COUNT | | | | | | | | | |
| 9 | EFCN HIGH THRESHOLD | | | | | | | CELL COUNT | | | | | | | | | |
| 10 | EFCN LOW THRESHOLD | | | | | | | CELL COUNT | | | | | | | | | |
| 11 | CELLS SERVICED | | | | | | | CELL COUNT | | | | | | | | | |
| 12 | CLP CELLS DISCARDED | | | | | | | CELL COUNT | | | | | | | | | |
| 13 | QF CELLS DISCARDED | | | | | | | CELL COUNT | | | | | | | | | |
| 14 | QNE CELLS DISCARDED | | | | | | | CELL COUNT | | | | | | | | | |
| 15 | | | | | | | (FULL & CLP) CELL COUNT | | | | | | | | | | |

*Figure 9*

| BIT # | 7 | 6 | 5 | 4 | 3 | 2 | 1 | 0 |
|---|---|---|---|---|---|---|---|---|
| FIRST CHANNEL | x | x | QUEUE CHANNEL # | | | | | |
| LAST SERVE OK CHANNEL | x | x | QUEUE CHANNEL # | | | | | |
| SERVICE DECISION | x | x | QUEUE CHANNEL # | | | | | |

*Figure 10*

| OFFSET | SR BIT # | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| 0 | WORD 0 | MIR COUNT (MC) | | | | | | | | PIR COUNT | | | | | | | |
| 1 | WORD 1 | MIR INCREMENT (MI) | | | | | | | | PIR INCREMENT | | | | | | | |
| 2 | WORD 2 | x | x | x | x | x | LQ | EQ | FMX | FMN | ET | NEXT CHANNEL # | | | | | |

*Figure 11a*

| OFFSET | SR BIT # | 23 | 22 | 21 | 20 | 19 | 18 | 17 | 16 |
|---|---|---|---|---|---|---|---|---|---|
| 0 | WORD 0 | x | TE | CMX | CM2 | CM1 | QE | MC | |
| 1 | WORD 1 | x | x | x | x | x | x | MI | |
| 2 | WORD 2 | x | x | x | x | x | x | x | x |

*Figure 11b*

| 8 7 6 5 4 3 | 2 | 1 | 0 |
|---|---|---|---|
| QUEUE CHANNEL # | T | E | S |

*Figure 13*

| 8 | 7 | 6 | 5 0 |
|---|---|---|---|
| B | A | N | QUEUE CHANNEL # |

*Figure 14*

QUEUE CHANNEL CONFIGURATIONS

- CONFIGURATION 0:   QUEUE CHANNEL OFF

- CONFIGURATION 1:   ALWAYS SERVE (TYPICALLY, NETWORK CENTRAL TRAFFIC)

- CONFIGURATION 2:   ALWAYS O.K. TO SERVE (A BEST EFFORT SERVICE)

- CONFIGURATION 3:   GUARANTEED BANDWIDTH, ACCESS TO SPARE BUS (VBR)

- CONFIGURATION 4:   GUARANTEED BANDWIDTH WITH SMOOTHING (VBR WHERE PEAK RATE MUST BE CONTAINED)

- CONFIGURATION 5:   MIN. BANDWIDTH WITH DELAY LIMITING (CBR)

*Figure 15*

| CONFIGURATION | MIN BW INCR (MI) | FMN | PIR INCR. | FMX | TE |
|---|---|---|---|---|---|
| ZERO | ZERO | DO NOT FORCE | ZERO | DO NOT FORCE | NO |
| ONE | DON'T CARE | FORCE | DON'T CARE | FORCE | NO |
| TWO | ZERO | DO NOT FORCE | DON'T CARE | FORCE | NO |
| THREE | SUM OF MIRS | DO NOT FORCE | DON'T CARE | FORCE | NO |
| FOUR | SUM OF MIRS | DO NOT FORCE | PEAK INFO RATE | DO NOT FORCE | NO |
| FIVE | SUM OF MIRS | DO NOT FORCE | DON'T CARE | FORCE | YES |

*Figure 16*

BANDWIDTH AND CONGESTION CONTROL FOR QUEUE CHANNELS IN A CELL SWITCHING COMMUNICATION CONTROLLER

FIELD OF THE INVENTION

The present invention pertains to the field of digital communication controllers. More particularly, this invention relates to controlling queue channel bandwidth and congestion in a cell switching communication controller.

BACKGROUND OF THE INVENTION

Packet switching networks are commonly employed to transfer digital information over long distances. More recent packet switching networks are also known as cell relay networks. A typical cell relay network is comprised of a set of cell switching communication controllers coupled together for communication over long distance communication links. A cell relay network enables a variety of communication devices coupled to local communication links to share the common carrier communication links. A cell relay network enables the communication devices to transfer digital information over the common carrier communication links on a demand driven basis. The demand driven sharing of the common carrier communication links reduces the cost of maintaining a long distance communication network.

The capacity of a cell network is usually limited by the bandwidth and connectivity of the cell switching communication controllers. For example, the topology of a typical cell network requires the communication controllers to perform high speed tandem switching. Tandem switching occurs when a communication controller receives a communication cell over one communication link, and transmits the communication cell over another communication link to route the communication cell to the proper destination.

A typical prior communication controller is comprised of a set of communication modules for transmitting and receiving high speed digital information over a communication link. During tandem switching, one communication module receives a communication cell over a communication link, and transfers the communication cell to another communication module which transmits the communication cell over another communication link. Each communication controller typically contains one or more first in first out cell queues for buffering the communication cells.

Typically, a cell network is required to support a variety of differing of data services. The differing data services include constant bit rate (CBR) services and variable bit rate (VBR) services. An example CBR service is a circuit emulation service that replaces conventional time division multiplex transmission service. An example VBR service is a bursty data service for a local area network.

A typical cell network allocates a set of service parameters to each data service. The service parameters include bandwidth, delay, and loss probability.

One typical prior communication controller implements a priority based cell queue mechanism wherein separate cell queues buffer the CBR traffic and the VBR traffic. The CBR traffic cell queues usually are assigned a higher service priority than the VBR traffic cell queues because CBR traffic is typically less tolerant of delays than VBR traffic.

Unfortunately in such systems, differing service types must be coupled through a common cell queue. Moreover, the high priority cell queues use most of the bandwidth of a communication link. As a consequence, such priority based cell queue mechanisms cannot allocate spare bandwidth fairly across the differing service types.

For example, such priority based cell queue mechanisms cannot fairly allocate bandwidth according to cell delay variation. The cell delay variation for a data service is a statistical measure of a random time interval between arrival of communication cells at a destination. Some CBR services demand limited cell delay variation, while other CBR services tolerate relatively wide cell delay variation.

In a priority based cell queue mechanism, the CBR services having a limited cell delay variation requirement and the CBR services having a wide cell delay variation requirement are typically assigned to a high priority cell queue because the cell delay variation of the lower priority queues cannot be guaranteed. As a consequence, the CBR services tolerant of wide cell delay variation use spare bandwidth that could otherwise be allocated to other services.

In addition, priority base cell queue mechanisms that allocate lower service priority to the VBR traffic cell queues are subject to cell queue overruns during VBR communication cell bursts. The cell queue overruns cause VBR communication cell losses. Moreover, the VBR services are subject to delays because the VBR traffic have a lower service priority even if the VBR service is relatively intolerant of delays.

SUMMARY AND OBJECTS OF THE INVENTION

One object of the present invention is to allocate bandwidth to queue channels in a cell switching communication controller.

Another object of the present invention is to control cell queue congestion in a communication network comprised of cell switching communication controllers.

A further object of the present invention is to enable selection of low-priority communication cells, wherein communication cells having a cell loss priority status bit set are discarded if the destination queue channel for the communication cell is congested.

Another object of the present invention is to allocate bandwidth to queue channels in a cell switching communication controller according to peak information rate and minimum information rate parameters.

Another object of the present invention is to provide advance notification of cell queue congestion by setting an explicit forward congestion notification bit in communication cells serviced from a cell queue approaching congestion.

These and other objects of the invention are provided by a method for buffering communication cells in a plurality of queue channels in a communication controller. A cell queuing circuit receives a first communication cell over a first communication link, wherein the first communication cell specifies a destination queue channel from among a plurality of queue channels. The first communication cell includes a cell loss priority status. If the cell loss priority status is in a first state and if a depth of a destination cell queue corresponding to the destination queue channel exceeds a cell loss priority threshold for the destination queue channel, then the queuing circuit discards the first communication cell. If the cell loss priority status is not in the first state or if the depth of the destination cell queue corresponding to the destination queue channel does not exceed the cell loss priority threshold, then the queuing circuit enters the communication cell into the destination cell queue. The queuing circuit updates a set of queue service control parameters for each queue channel in a service chain while determining a next serviced queue channel in the service chain according to the queue service control parameters, wherein the queue service control parameters specify bandwidth allocation on a second communication link. The queuing circuit accesses a second communication cell from a serviced cell queue specified by the next serviced queue channel, and transfers the second communication cell over the second communication link.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which:

FIG. 8 illustrates the format of a link register in the CQE data SRAM which determines the cell queue RAM block for a next cell entry of a cell queue;

FIG. 9 illustrates a format of the cell queue control blocks in the CQE data SRAM;

FIGS. 10 illustrates a set of cell service registers contained in the CSE including a first channel register, a last serve ok channel register, and a service decision register;

FIG. 11 illustrates the format of the queue service control blocks in the CSE data SRAM;

FIG. 13 illustrates the format of a cell queue status event which indicates the cell queue specified by the status event;

FIG. 14 illustrates the next service register which stores the current highest priority queue channel selected by the CSE while scanning the service chain;

FIG. 15 illustrates a set of queue channel configurations for one embodiment;

FIG. 16 illustrates the parameter settings in the cell queue control blocks that correspond to the queue channel configurations for one embodiment.

DETAILED DESCRIPTION

Figure 1:
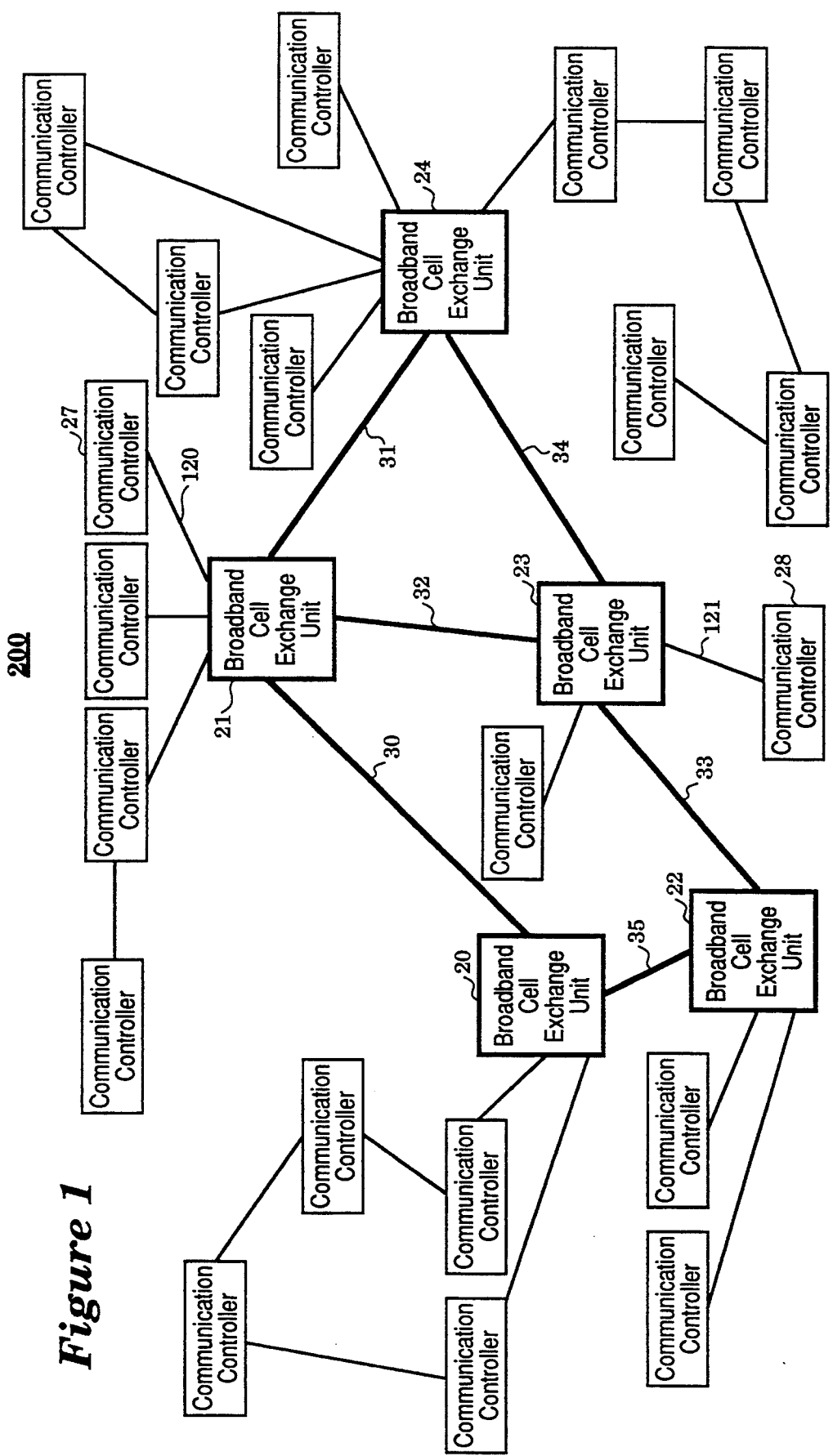
FIG. 1 illustrates one communication network comprising of a set of cell switching communication controllers (CC) and a set of broadband cell exchange units (BCX)

FIG. 1 illustrates one communication network 200. The communication network 200 is comprised of a set of cell switching communication controllers (CC) and a set of broadband cell exchange units (BCX)20-24.

The cell switching communication controllers CC enable communication over high speed digital communication links according to a cell switching communication protocol. For example, a cell switching communication controller 27 enables communication over a communication link 120, and a cell switching communication controller 28 enables communication over a communication link 121.

The cell switching communication controllers CC enable long distance communication over the communication network 200 among a wide variety of communication devices. For example, communication devices such as private branch exchanges (PBXs), video communication controllers, and local area networks communicate through the cell switching communication controllers CC.

The broadband cell exchange units 20-24 enable communication over a set of broadband communication links 30-35 according to a cell switching communication protocol. For example, the BCX 21 enables communication over the broadband communication links 30-32, and the BCX 23 enables communication over the broadband communication links 32-34.

The BCX 21 also enables communication over communication links to the cell switching communication controllers CC. For example, the BCX 21 enables communication with the CC 27 over the communication link 120, and the BCX 23 enables communication with the CC 28 over the communication link 121.

For one embodiment, the BCXs 20-24 perform tandem switching for the communication network 200. For example, a communication device coupled to the CC 27 communicates with a communication device coupled to the CC 28 by transferring communication cells through the CC 27, the BCX 21, the BCX 23, and the CC 28. For communication between the CC 27 and the CC 28, the BCX 21 switches communication cells between the communication link 120 and the broadband communication link 32, while the BCX 23 switches communication cells between the broadband communication link 32 and the communication link 121.

The BCXs 20-24 increase the capacity of the communication network 200 by performing broadband tandem switching of the communication cells. For one embodiment, each BCX 20-24 enables high speed communication over thirty six separate broadband communication links. The BCXs 20-24 are each substantially similar.

For another embodiment, the BCXs 20-24 enable long distance communication over the communication network 200 among a wide variety of broadband communication devices.

Figure 2:
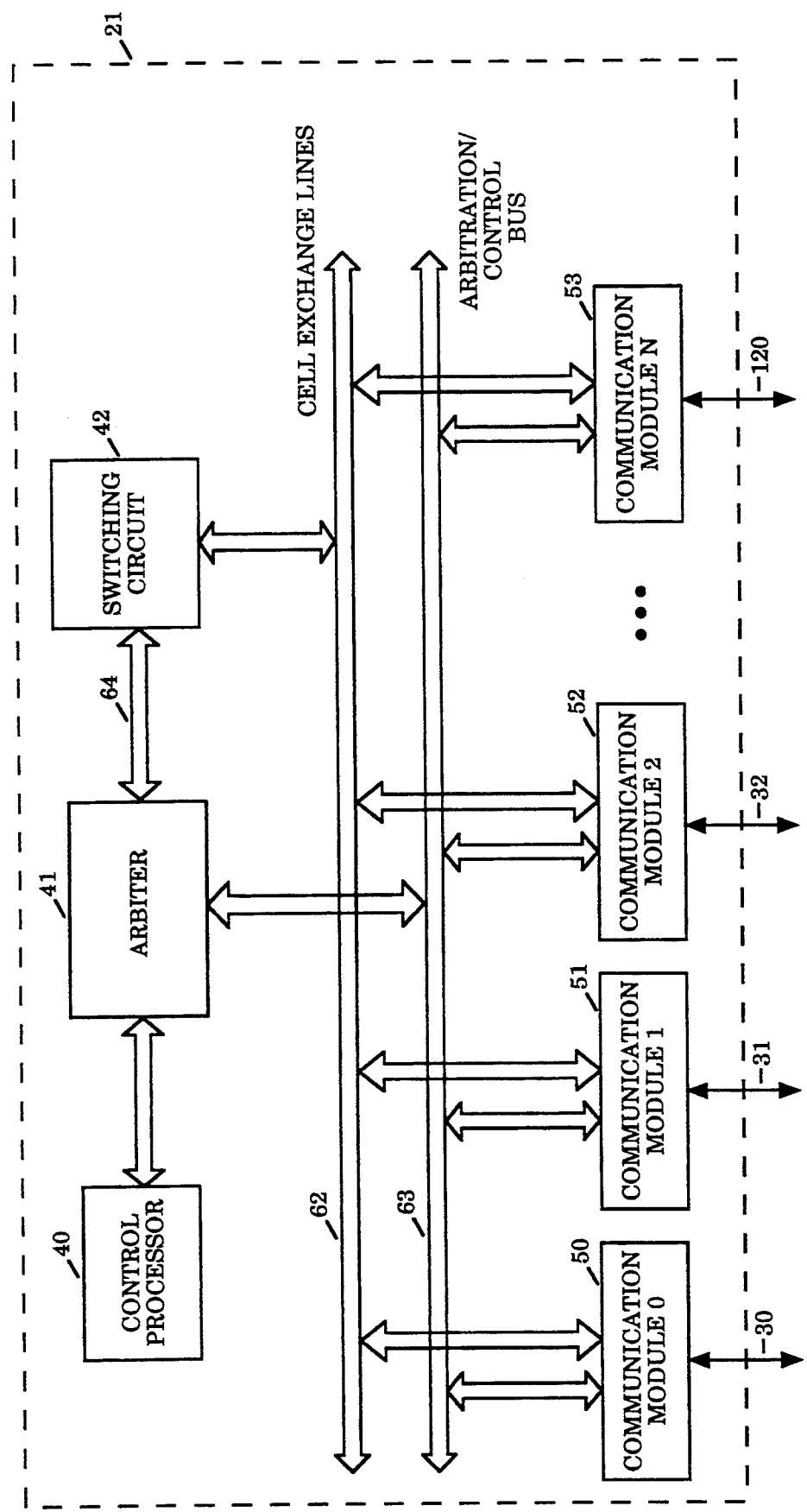
FIG. 2 is a block diagram of a broadband cell exchange unit comprising a set of communication modules, along with a control processor, an arbiter, and a switching circuit.

FIG. 2 is a block diagram of the BCX 21. The BCX 21 is comprised of a set of communication modules 50-53, along with a control processor 40, an arbiter 41, and a switching circuit 42.

The communication modules 50-53 enable high speed communication over a variety of communication links according to a cell switching communication protocol. For example, the communication modules 50-52 enable communication over the broadband communication links 30-32, respectively. The communication module 53 enables communication over the communication link 120. Any one of the communication modules 50-52 may enable communication over a plurality of broadband communication links.

The communication modules 50-53 exchange communication cells over a set of cell exchange lines 62. The exchange lines 62 comprise multiple pairs of transmit and receive data lines. The cell exchange lines 62 provide a pair of transmit and receive data lines for each of the communication modules 50-53. The cell exchange lines 62 enable concurrent transmission of multiple serial data streams among the communication modules 50-53.

The switching circuit 42 selectively couples the cell exchange lines 62 to provide full serial communication connectivity among the communication modules 50-53.

The arbiter 41 controls the configuration of the switching circuit 42. The arbiter 41 polls the communication modules 50-53 over an arbitration/control bus 63 to determine transmission requests. The arbiter 41 configures the switching circuit 42 for single-destination transmissions and multi-cast transmissions.

A configuration of the switching circuit 42 for a single-destination transmission provides a serial data transfer link between one source communication module and one destination communication module. A configuration of the switching circuit 42 for a multi-cast transmission provides multiple serial data transfer links from one source communication module to multiple destination communication modules.

The BCX 21 performs tandem switching by exchanging communication cells over the cell exchange lines 62. An inbound communication cell is received from the network 200 by a source communication module, then transferred through a serial data transfer link in the cell exchange lines 62 to a destination communication module, then transferred to the network 200 as an outbound communication module.

For example, the BCX 21 performs tandem switching between the broadband communication links 30 and 31 by exchanging communication cells between the communication modules 50 and 51 over the cell exchange lines 62. The communication module 50 receives an inbound communication cell over the broadband communication link 30. Thereafter, the communication module 50 generates a transmission request in response to a poll by the arbiter 41. The transmission request specifies the communication module 51 as the destination.

The arbiter 41 then configures the switching circuit 42 to create the serial data transfer link for the transmission request between the communication modules 50 and 51. Thereafter, the communication module 50 transmits the communication cell over the configured serial data transfer link on the cell exchange lines 62 to the communication module 51. The communication module 51 receives the communication cell over the configured serial data transfer link, and transmits the communication cell over the broadband communication link 31 as an outbound communication cell.

Similarly, the communication module 51 receives an inbound communication cell over the broadband communication link 31. In response to a poll by the arbiter 41, the communication module 51 generates a transmission request specifying the communication module 50 as the destination. The arbiter 41 then configures the switching circuit 42 to create the requested serial data transfer link, and the communication module 51 transmits the communication cell through the switching circuit 42 to the communication module 50 over the cell exchange lines 62. The communication module 50 receives the communication cell, and transmits the communication cell over the broadband communication link 30 as an outbound communication cell.

The arbiter 41 polls the communication modules 50-53 according to a sequence determined by the control processor 40. The control processor 40 determines the poll sequence ordering and priority to ensure that each of the communication modules 50-53 have sufficient access to serial data transfer links through the switching circuit 42.

Figure 3:
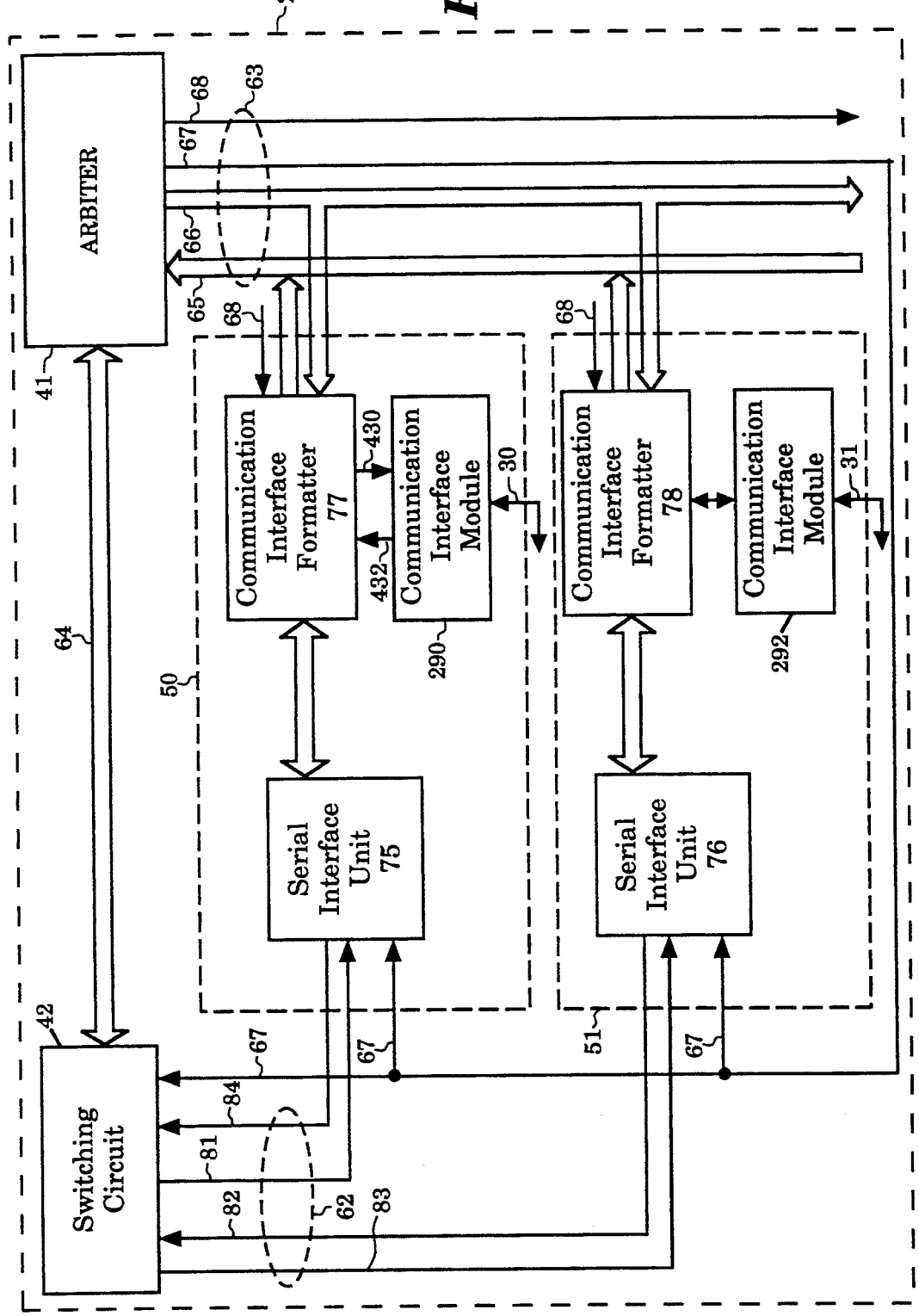
FIG. 3 is a block diagram of a broadband cell exchange unit that functionally illustrates serial communication between a pair of communication modules through the cell exchange lines.

FIG. 3 is a block diagram of the BCX 21 that functionally illustrates serial communication between the communication modules 50 and 51 through the cell exchange lines 62. The communication module 50 is comprised of a serial interface unit (SIU) 75, a communication interface formatter (CIF) 77, and a communication interface module (CIM) 290. Similarly, the communication module 51 is comprised of an SIU 76, a CIF 78, and a CIM 292.

The CIF 77 transfers communication cells over the broadband communication link 30 through the CIM 290. The CIF 78 transfers communication cells over the broadband communication link 31 through the CIM 292. The CIF 77 and the CIF 78 also process polls from the arbiter 41 over the arbitration/control bus 63.

The SIU 75 and the SIU 76 enable serial communication through configured serial data transfer links in the switching circuit 42 over the cell exchange lines 62. The cell exchange lines 62 comprise multiple pairs of transmit and receive data lines. The cell exchange lines 62 include a transmit data line 84 and a receive data line 81 coupled to the SIU 75, and a transmit data line 82 and a receive data line 83 coupled to the SIU 76.

The CIF 77 receives inbound communication cells from the broadband communication link 30 through the CIM 290. The CIF 77 then determines the destination communication module(s) for the inbound communication cells from among the communication modules 50-53. The CIF 77 encapsulates the inbound communication cells into an internal cell frame format, and transfers the cell frames to the SIU 75. The SIU 75 transfers the cell flames over the transmit data line 84 through the switching circuit 42 to the appropriate destination communication module(s).

The SIU 75 receives serial data over the receive data line 81, and performs clock frame recovery and data recovery. The SIU 75 receives cell frames containing outbound communication cells over the receive data line 81, and transfers the cell flames to the CIF 77. The CIF 77 disassembles the cell frames into outbound communication cells, and transfers the outbound communication cells to the CIM 290 for transfer over the broadband communication link 30.

Similarly, the CIF 78 receives inbound communication cells from the broadband communication link 31 through the CIM 292, and determines the destination communication module(s) from among the communication modules 50-53. The CIF 78 encapsulates the inbound communication cells into cell frames, and transfers the cell frames to the SIU 76. The SIU 76 transfers the cell frames over the transmit data line 82 through the switching circuit 42. The SIU 76 receives the cell flames over the receive data line 83, performs clock and data recovery, and transfers the cell frames to the CIF 78. The CIF 78 disassembles the cell frames into outbound communication cells, and transfers the outbound communication cells to the CIM 292 for transfer over the broadband communication link 31.

The arbiter 41 causes the switching circuit 42 to selectively couple the transmit data lines from the communication modules 50-53 to the receive data lines of the communication modules 50-53. For example, switching circuit 42 selectively couples the transmit data line 84 to the receive data line 83, and selectively couples the transmit data line 82 to the receive data line 81. For one embodiment, the switching circuit 42 is a crosspoint switch.

The arbiter 41 generates a FRAME signal 67 to synchronize serial communication over the cell exchange lines 62 and to control the polling sequence over the arbitration/control bus 63. The FRAME signal 67 determines the boundaries of a series of time frames (FRAMEs) for transferring cell frames over the cell exchange lines 62 and for polling the communication modules 50-53.

The arbiter 41 configures the switching circuit 42 by transferring configuration data to the switching circuit 42 over a configuration bus 64. The configuration data determines serial data transfer links between the transmit and receive data lines of the cell exchange lines 62. The configuration data is stored in a set of configuration registers (not shown) in the switching circuit 42. The configuration registers comprise a double buffered arrangement of first and second register sets. One register set having an active status controls current configuration of the switching circuit 42, while the other set having a non active status are available to receive configuration data from the arbiter 41. The FRAME signal 67 causes the switching circuit 42 to transfer the configuration data from the non active register set to the active register set.

During a current FRAME, the arbiter 41 polls the communication modules 50-53 to determine transmission requests for the next FRAME. Also during the current FRAME, the communication modules 50-53 transmit cell frames over serial data transfer links in the cell exchange lines 62 that were granted during the previous FRAME.

Before the next FRAME begins, the arbiter 41 transfers configuration data for the next FRAME to the non active configuration registers of the switching circuit 42. Thereafter, the FRAME signal 67 corresponding to the start of the next FRAME transfers data from the non active to active configuration registers, thereby reconfiguring of the switching circuit 42. During the next FRAME, the arbiter 41 again polls the communication modules 50-53 for transmission requests, while cell frames are transferred through the configured serial data transfer links in the switching circuit 42.

The arbitration/control bus 63 includes a polling bus 66 and a response bus 65, and a grant signal 68. The arbiter 41 individually polls the CIF 77 and the CIF 78 over the polling bus 66. The arbiter 41 issues two basic types of polls over the polling bus 66: a single-destination poll, and a multi-cast poll. In turn, the CIF 77 and the CIF 78 respond with either a single-destination request, a multi-cast request, or a null request over the response bus 65. If the destination for the transmission request is available, the arbiter 41 issues the grant signal 68.

For example, after receiving an inbound communication cell over the broadband communication link 30, the CIF 77 holds the communication cell while waiting for a poll from the arbiter 41. When the arbiter 41 issues a single-destination poll to the CIF 77, the CIF 77 responds with a single-destination request if the communication cell has only one destination among the communication modules 50-53. However, if the communication cell has multiple destinations, the CIF 77 waits for a multi-cast poll from the arbiter 41, and then responds with a multi-cast request.

Figure 4:
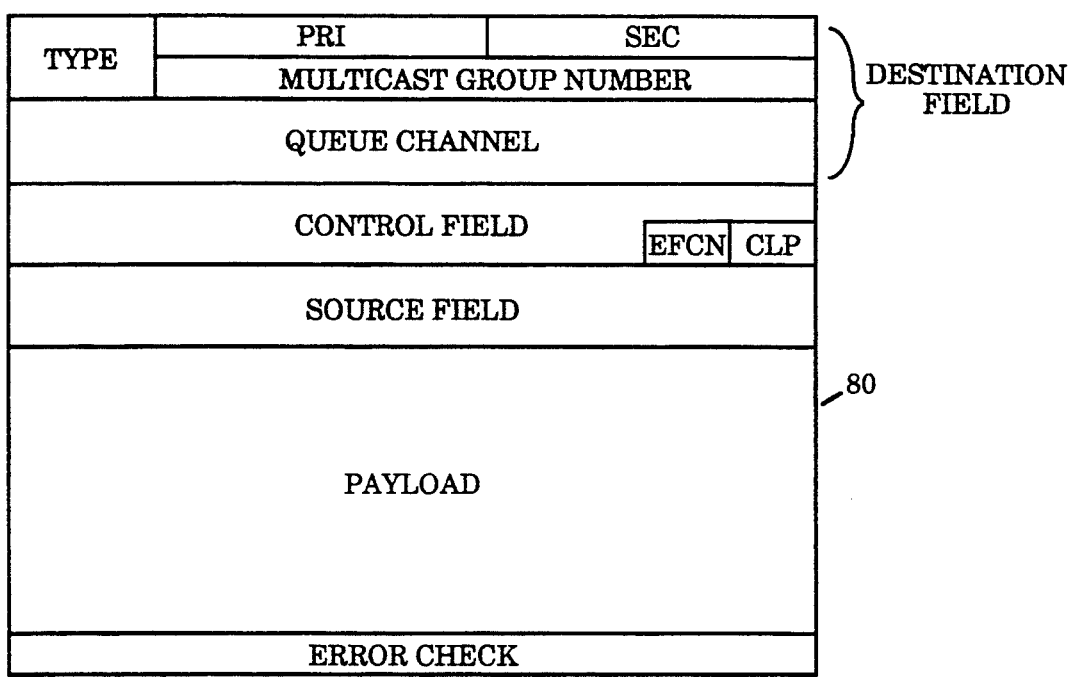
FIGS. 4 illustrates the format for a cell frame transferred over the cell exchange lines.

FIG. 4 illustrates the format for a cell frame 80. The cell frame 80 has a header field comprising a destination field, a control field, a source address, and an error check word. The source field specifies the source communication module 50-53 for the cell frame 80. The destination field specifies the destination communication module 50-53 for the cell frame 80, as well as a queue channel.

The destination field of the cell frame 80 includes a type field (TYPE), and either a primary destination address (PRI DEST) and a secondary destination address (SEC DEST), or a multicast group number. The type field specifies whether the cell frame 80 is a single destination cell frame, a multicast cell frame, a null cell frame, or a test cell frame.

If the type field specifies a single destination cell, the primary destination address specifies the primary communication module destination for the cell frame 80 and the secondary destination address specifies a backup communication module destination for the cell frame 80.

If the type field specifies a multicast cell, the multicast group number specifies a group of multicast destinations.

Null cell frames are transferred during data FRAMEs through non configured links in the switching circuit 42 to maintain bit synchronization in the data receivers of the SIUs.

The queue channel field specifies one of the queue channels contained in the interface module of the destination communication module.

The control field comprises a cell loss priority (CLP) bit and an explicit forward congestion notification (EFCN) bit. The CLP and EFCN bits are employed to control cell queue congestion in the communication network 200.

Figure 5:
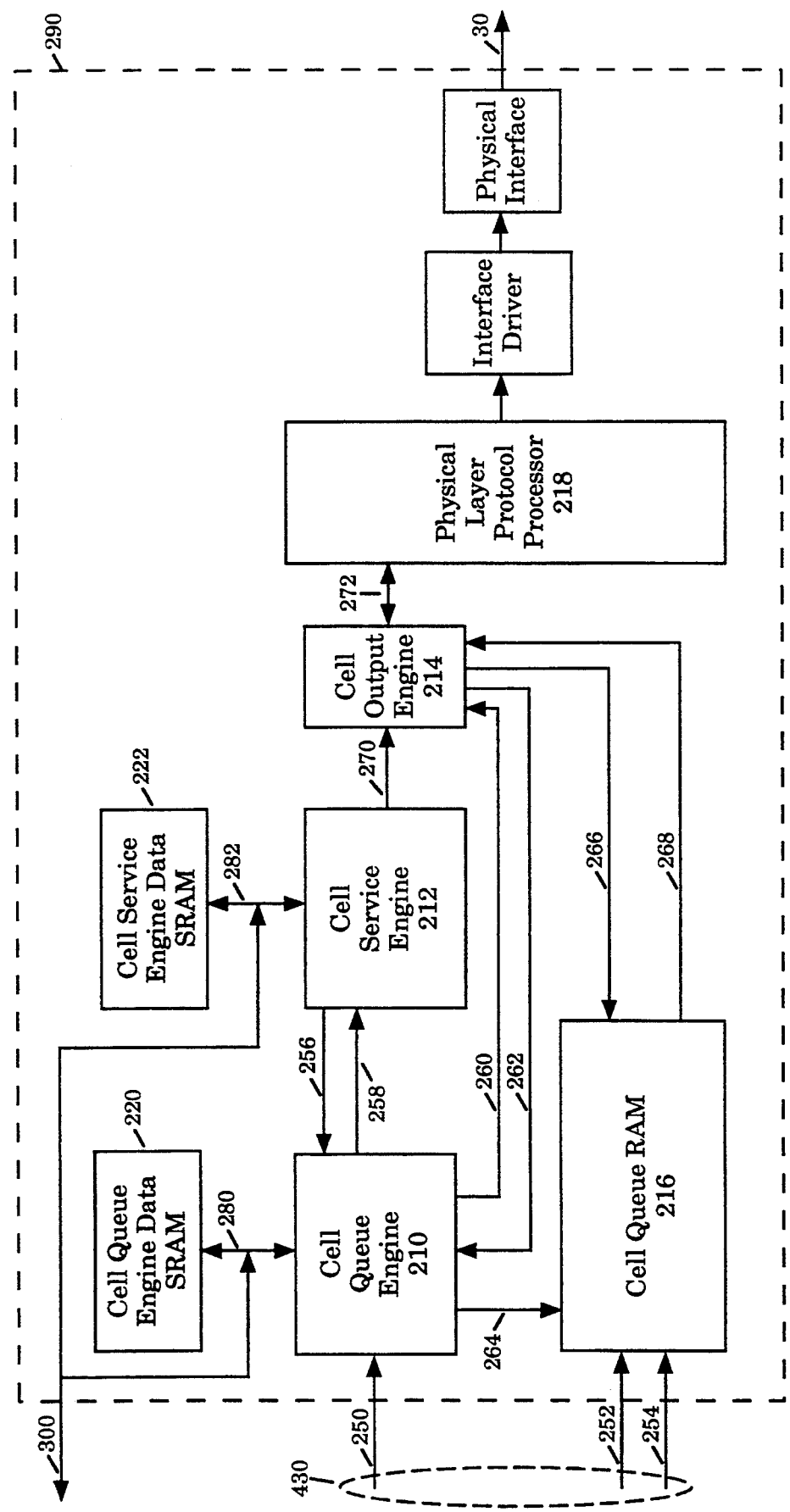
FIG. 5 is illustrates a cell queuing circuit in the interface module which comprises a cell queue engine, a cell service engine, and a cell output engine.

FIG. 5 illustrates a cell queuing circuit in the CIM 290. The cell queuing circuit comprises a cell queue engine (CQE) 210, a cell service engine (CSE) 212, and a cell output engine (COE) 214. The cell queuing circuit receives outbound communication cells from the CIF 77, and buffers the outbound communication cells for transfer over the broadband communication link 30.

The cell queuing circuit contains a set of queue channels for buffering the outbound communication cells and for providing bandwidth allocation and congestion control for the broadband communication link 30. The cell queuing circuit transfers outbound communication cells over the broadband communication link 30 during transfer intervals of the broadband communication link 30.

The CQE 210 maintains a set of cell queues in a cell queue RAM 216. Each cell queue in the cell queue RAM 216 buffers outbound communication cells for one of the queue channels of the CIM 290. Each cell queue in the cell queue RAM 216 corresponds to a queue channel. The queue channel field of the cell frame 80 maps the outbound communication cell contained in the cell frame 80 to one of the cell queues in the cell queue RAM 216.

The CSE 212 controls the servicing of the cell queues from the cell queue RAM 216. The CSE 212 generates a service decision for each transfer interval of the broadband communication link 30. Each service decision specifies one of the queue channels for servicing. The cell queuing circuit transfers an outbound communication cell from the cell queue specified by the service decision during a transfer interval over the broadband communication link 30.

The COE 214 accesses an outbound communication cell from the cell queue RAM 216 according to each service decision. The COE 214 synchronizes transfer of the outbound communication cell to a physical layer protocol processor (PLPP) 218 over a cell queue output bus 268.

The PLPP 218 converts the outbound communication cells from the cell queue RAM 216 into a framing format for the broadband communication link 30.

For one embodiment, the broadband communication link 30 comprises a T3 communication line, and the PLPP 218 performs T3 framing for the broadband communication link 30. A transfer interval over the T3 broadband communication link 30 occurs every 10.5 microseconds, and the CSE 212 generates a service decision every 10.5 microseconds.

For one embodiment, the cell queue RAM 216 is comprised of multiple banks of triple port DRAMs. The three ports of the cell queue RAM 216 comprise a serial input port, a serial output port, and a parallel port. The cell queue RAM 216 has the capacity to store up to 24 k outbound communication cells, which corresponds to approximately 0.25 seconds of traffic for a T3 communication link.

The cell queue RAM 216 receives outbound communication cells from the CIF 77 through the serial input port of the cell queue RAM 216. The outbound communication cells from the CIF 77 are received over a cell queue input bus 254. The outbound communication cells from the CIF 77 are synchronized by a shift clock signal 252 generated by the CIF 77.

The CQE 210 addresses the cell queues in the cell queue RAM 216 through the parallel port of the cell queue RAM 216. The parallel port of the cell queue RAM 216 is addressed over a cell queue address bus 264.

The cell queue RAM 216 transfers outbound communication cells to the COE 214 through the serial output port of the cell queue RAM 216 over a cell queue output bus 268. The outbound communication cells to the COE 214 are synchronized by a shift clock signal 266 generated by the COE 214.

The CQE 210 receives queue channel numbers from the queue channel fields of the outbound communication cells from the CIF 77 over a CQE control bus 250. The CQE 210 then generates cell queue addresses over the cell queue address bus 264 to route the outbound communication cells into the appropriate cell queues according to the queue channels specified on the CQE control bus 250.

The CQE 210 receives the CLP bits from the control fields of the outbound communication cells from the CIF 77 over the CQE control bus 250. The CQE 210 uses the CLP bits to determine whether to discard outbound communication cells according to a CLP mechanism for the queue channels.

The CSE 212 notifies the CQE 210 of the cell service decisions by transferring a cell queue service value to the CQE 210 over a set of signal lines 256. The CSE 212 transfers a cell queue service value to the CQE 210 at the start of each transfer interval over the broadband communication link 30. The cell queue service value specifies one of the queue channels.

The CQE 210 receives the cell queue service value, and generates cell queue addresses over the cell queue address bus 264 to transfer an outbound communication cell from the cell queue corresponding to the specified queue channel to the PLPP 218.

The CQE 210 transfers cell queue status information to the CSE 212 over a set of signal lines 258. The cell queue status information provides updated status information to the CSE 212. The updated status indicates the status of the cell queues in the cell queue RAM 216.

The CSE 212 notifies the COE 214 of the cell service decisions by transferring a new cell service signal over a signal line 270. The new cell service signal 270 causes the COE 214 to generate the shift clock signal 266. The shift clock signal 266 synchronizes transfer of an outbound communication cell from the cell queue RAM 216 to the PLPP 218.

The CSE 212 determines the service decisions according to a set of bandwidth allocation parameters. Each queue channel has a corresponding set of bandwidth allocation parameters. The bandwidth allocation parameters include a peak information rate and a minimum information rate for the corresponding queue channel.

The CSE 212 also determines the service decisions according to a set of congestion control parameters. Each queue channel has a corresponding set of congestion control parameters. The congestion control parameters include a high cell loss priority (CLP) threshold, a low CLP threshold, a high explicit forward congestion notification (EFCN) threshold, a low EFCN threshold, and a maximum depth for the corresponding cell queue.

The CQE 210 maintains a set of cell queue control blocks in a CQE data static random access memory (SRAM) 220. The cell queue control blocks store configuration and control information for the cell queues in the cell queue RAM 216. The control processor 40 programs initial configuration and control information into the CQE data SRAM 220 over a control processor bus 300. The configuration and control information includes cell queue pointers, as well as CLP and EFCN threshold values.

The CSE 212 maintains a set of queue service control blocks in a CSE data SRAM 222. The queue service control blocks store bandwidth allocation parameters and control values, as well as the congestion control parameters and control values for each of the queue channels. The control processor 40 programs initial bandwidth allocation values and congestion control values into the CSE data SRAM 222 over the control processor bus 300.

Figure 6:
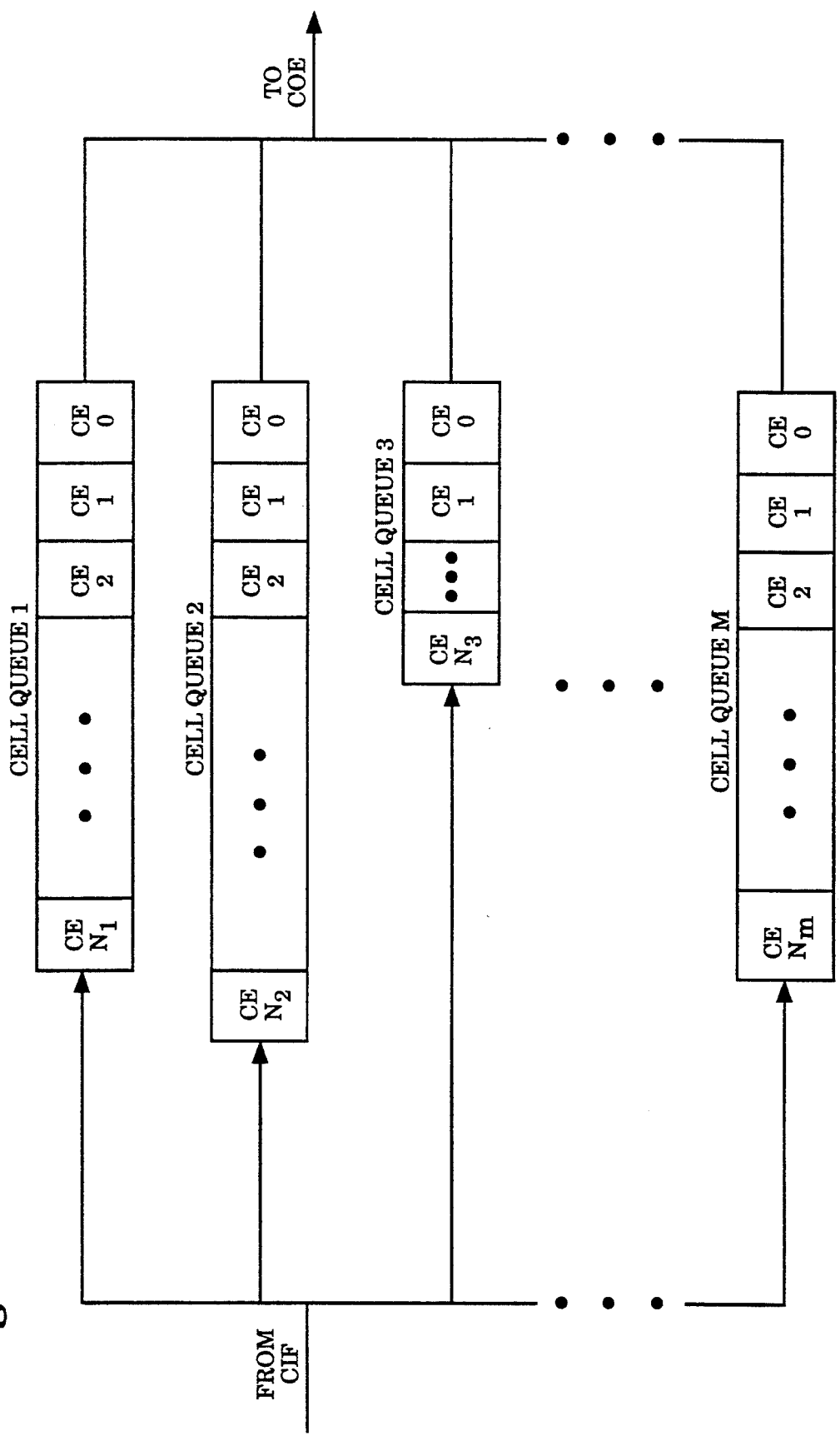
FIG. 6 illustrates a set of cell queues 1 through m in the cell queue RAM which correspond to a set of queue channels 1 through m.

FIG. 6 illustrates a set of cell queues in the cell queue RAM 216. The cell queues comprise a cell queue 1 through a cell queue m. The cell queues 1 through m correspond to a set of queue channels 1 through m. The cell queues 1 through m are each arranged as first-in-first-out (FIFO) buffers. Each cell queue 1 through m is comprised of a set of cell entries (CE). Each cell entry buffers an outbound communication cell.

The cell queues 1 through m are maintained by the CQE 210. The CQE 210 controls the transfer of outbound communication cells from the CIF 77 into the cell queues 1 through m. The CQE 210 routes an outbound communication cell into cell queues 1 through m according to the queue channel field of the outbound communication cell. Outbound communication cells having a destination field equal to 1 are routed to cell queue 1, while outbound communication cells having a destination field equal to 2 are routed to cell queue 2, and so on.

The cell queue 1 buffers outbound communication cells in a set of cell entries CE O-CE $n_1$. The maximum depth for the cell queue 1 is equal to $n_1+1$. The cell queue 2 buffers outbound communication cells in a set entries CE 0-CE $n_2$. The maximum depth for the cell queue 2 is $n_2+1$.

The cell queue 3 buffers outbound communication cells in a set of cell entries CE O-CE $n_3$, and has a maximum depth equal to $n_3+1$. The cell queue m buffers outbound communication cells in a set of cell entries CE 0-CE $n_m$, and has a maximum depth of $n_{m+1}$.

Figure 7:
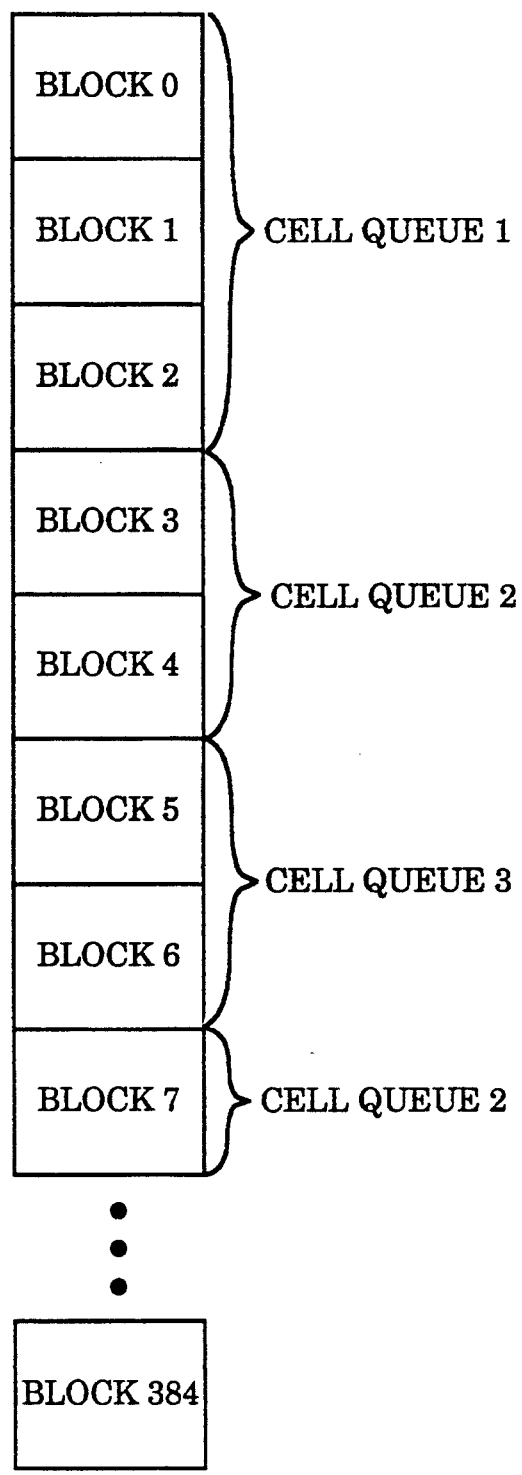
FIG. 7 illustrates an example set of cell queues 1-3 in the cell queue RAM, wherein the cell queue RAM is logically subdivided into a set of 384 cell queue RAM blocks.

FIG. 7 illustrates an example set of cell queues 1-3 in the cell queue RAM 216. The cell queue RAM 216 is logically subdivided into a set of 384 cell queue RAM blocks. Each cell queue RAM block stores up to 64 outbound communication cells.

The cell queue 1 comprises cell queue RAM blocks 0, 1, and 2 in the cell queue RAM 216. The cell queue 2 comprises cell queue RAM blocks 3, 4, and 7 in the cell queue RAM 216. The cell queue 3 comprises cell queue RAM blocks 5 and 6 in the cell queue RAM 216.

FIG. 8 illustrates the format of a link register in the CQE data SRAM 220. The CQE data SRAM 220 contains 384 link registers corresponding to the 384 cell queue RAM blocks of the cell queue RAM 216. The CQE 210 reads the link registers to determine the ordering of the cell queue RAM blocks for a cell queue in the cell queue RAM 216.

Each link register contains a next block field that specifies the next cell queue RAM block for a cell queue. The last link register for a cell queue points back to the first cell queue RAM block of the cell queue, thereby closing the loop.

For the example cell queue 2 shown in FIG. 7, the link register corresponding to the cell queue RAM block 3 contains a 4, the link register corresponding to the cell queue RAM block 4 contains a 7, and the link register corresponding to the cell queue RAM block 7 contains a 3.

FIG. 9 illustrates a format of the cell queue control blocks in the CQE data SRAM 220. The CQE data SRAM 220 contains a cell queue control block for each queue channel.

For one embodiment, each cell queue control block comprises a set of 16 data words (offsets 0-15), wherein each data word comprises 16 bits. The CQE data SRAM 220 stores 64 cell queue control blocks, which enables the CQE 210 to maintain up to 64 cell queues in the cell queue RAM 216 for up to 64 queue channels.

The maximum depth of the corresponding cell queue is stored at word offset 3. The maximum depth is a cell count of the number of cell entries in the corresponding cell queue. The maximum depth specifies the capacity of the corresponding cell queue.

The CQE 210 stores a queue pointer for the corresponding cell queue at word offset 4 of the cell queue control block. The queue pointer specifies a cell entry in the corresponding cell queue. The CQE 210 routes a next outbound communication cell for the corresponding queue channel into the cell entry specified by the queue pointer.

The queue pointer comprises a block number and an offset. The block number specifies a cell queue RAM block in the cell queue RAM 216. The offset specifies a cell entry within the cell queue RAM block.

The CQE 210 stores a service pointer for the corresponding cell queue at word offset 5 of the cell queue control block. The service pointer specifies a cell entry in the corresponding cell queue. The CQE 210 transfers an outbound communication from the cell entry specified by the service pointer when the corresponding cell queue is serviced.

The CQE 210 stores a cell queue depth for the corresponding cell queue at word offset 6 of the cell queue control block. The cell queue depth is a cell count indicating the number of cell entries currently occupied in the corresponding cell queue.

The CLP high threshold and the CLP low threshold for the corresponding cell queue are stored at word offsets 7 and 8 of the cell queue control block.

The EFCN high threshold and the EFCN low threshold for the corresponding cell queue are stored at word offsets 9 and 10 of the cell queue control block.

The CQE 210 stores a cell count of the number of cells serviced from the corresponding cell queue at word offset 11 of the cell queue control block. The CQE 210 stores a cell count of the number of CLP communication cells discarded that were destined for the corresponding cell queue at word offset 12 of the cell queue control block. The CQE 210 stores a cell count indicating the number of communication cells that were destined for the cell queue but were discarded due to a queue full condition at word offset 13 of the cell queue control block. The CQE 210 stores a cell count indicating the number of cells discarded due to a queue not enabled condition for the corresponding cell queue at word offset 14 of the cell queue control block.

A set of state/control bits are stored at word offset O of the cell queue control block.

The QEN bit indicates whether the corresponding queue channel is enabled. If the queue channel is not enabled, the CQE 210 does not route outbound communication cells into the corresponding cell queue. The QEN bit is programmed by the control processor 40 over the control processor bus 300.

The EC bit indicates whether the CLP mechanism for the corresponding queue channel is enabled. If the CLP mechanism is enabled and if the CS bit is set, the CQE 210 discards outbound communication cells for the corresponding queue channel having the CLP bit set in the control field. The CQE 210 discards an outbound communication cell by not routing the outbound communication cell into a cell entry in the cell queue RAM 216. The EC bit is programmed by the control processor 40 over the control processor bus 300.

The CS bit indicates whether the cell queue depth for the corresponding cell queue exceeds the CLP high threshold for the cell queue. The CQE 210 sets the CS bit if the cell queue depth is greater than the CLP high threshold. Thereafter, the CQE 210 clears the CS bit if the cell queue depth falls below the CLP low threshold.

The EE bit indicates whether the explicit forward congestion notification (EFCN) mechanism for the corresponding queue channel is enabled. If the EFCN mechanism is enabled and if the ES bit is set, the CQE 210 transfers an EFCN signal 260 to the COE 214 when the corresponding queue channel is serviced. The COE 214 receives the EFCN signal 260 and accordingly sets the EFCN bit in the control field of the outbound communication cells transferred to the PLPP 218. The EE bit is programmed by the control processor 40 over the control processor bus 300.

The ES bit indicates whether the cell queue depth for the corresponding cell queue exceed the EFCN high threshold for the cell queue. The CQE 210 sets the ES bit if the cell queue depth is greater than the EFCN high threshold. Thereafter, the CQE 210 clears the ES bit if the cell queue depth falls below the EFCN low threshold.

The QF bit indicates whether the corresponding cell queue is full. The CQE 210 sets the QF bit if the corresponding cell queue depth equals the corresponding maximum depth.

The QE bit indicates whether the corresponding cell queue is empty. The CQE 210 sets the QE bit if the corresponding queue pointer equals the corresponding service pointer. The CQE 210 clears the QE bit otherwise.

FIG. 10 illustrates a set of queue service registers contained in the CSE 212. The queue service registers comprise a first channel register, a last serve ok channel register, and a service decision register. The queue service registers are employed by the CSE 212 when determining a service decision.

The first channel register stores a queue channel number that specifies a first queue channel in a service chain. The control processor 40 programs the first queue channel into the first channel register over the control processor bus 300.

The CSE 212 stores a queue channel number in a last serve ok channel register that indicates the last queue channel serviced according to the spare bandwidth allocation.

The CSE 212 stores a queue channel number in the service decision register that indicates a current queue channel selected for servicing.

FIG. 11 illustrates the format of the queue service control blocks in the CSE data SRAM 222. The CSE data SRAM 222 contains a queue service control block for each queue channel.

For one embodiment, each queue service control block comprises a set of 3 data words (offsets 0-2), wherein each data word comprises 24 bits. The CSE data SRAM 222 stores 64 queue service control blocks, which enables the CSE 212 to service up to 64 queue channels.

The QE bit indicates whether the corresponding cell queue in the cell queue RAM 216 is empty. The QE bit reflects the status of the QE bit in the corresponding cell queue control block in the CQE data SRAM 220. The CQE 210 transfers the QE bit status to the CSE 212 over the signal line 258.

The CM1 bit and the CM2 bit are MIR credits for the corresponding queue channel. The CM1 bit and the CM2 bit are maintained by the CSE 212.

The CMX bit is a PIR credit for the corresponding queue channel. The CMX bit is maintained by the CSE 212.

The TE bit indicates whether the cell queue depth for the corresponding cell queue exceeds the CLP high threshold. The CQE 210 transfers the TE bit status to the CSE 212 over the signal line 258.

A peak information rate (PIR) count and a minimum information rate (MIR) count are stored at word offset 0 of the queue service control block. For one embodiment, the PIR count and the MIR count each comprise 9 bits. The PIR count and the MIR count are maintained by the CSE 212.

A PIR increment value and an MIR increment value are stored at word offset 1 of the queue service control block. The PIR increment value and the MIR increment value are programmed by the control processor 40 over the control processor bus 300.

For one embodiment, the PIR increment value and the MIR increment value each comprise 9 bits. The 9 bit resolution of the PIR and MIR parameters enable allocation of the bandwidth to the queue channel with a resolution of 1/512.

A next channel number is stored at word offset 2 of the queue service control block. The next channel number indicates a next queue channel in a service chain scanned by the CSE 212. The next channel number is programmed by the control processor 40 over the control processor bus 300.

The ET bit is an enable threshold bit. The ET bit is programmed by the control processor 40 over the control processor bus 300.

The force minimum (FMN) credit bit indicates whether the corresponding queue channel always has an MIR credit. The force maximum FMX credit bit indicates whether the corresponding queue channel always has a PIR credit. The FMN bit and the FMX bit are programmed by the control processor 40 over the control processor bus 300.

The EQ bit indicates whether the corresponding queue channel is enabled. The LQ bit indicates whether the corresponding queue channel is the last queue channel in a service chain. The EQ bit and the LQ bit are programmed by the control processor 40 over the control processor bus 300.

The control processor 40 allocates bandwidth to the queue channels in fractions of the total available bandwidth of the broadband communication link 30. The control processor 40 controls the minimum information rate for a queue channel by programming the corresponding MIR increment value and the corresponding FMN bit. The control processor 40 controls the peak information rate for a queue channel by programming the corresponding PIR increment value and the corresponding FMX bit.

For one embodiment, the 9 bit resolution of the MIR count and increment values and the PIR count and increment values enables bandwidth allocation in increments of 187.5 cells per second for a T3 communication link. Such bandwidth increments are equivalent to a 64 kbps bandwidth resolution.

For example, if the MIR increment value for a queue channel is set to 0, the queue channel has no guaranteed minimum bandwidth. If the MIR increment value for a queue channel is set to 511, the queue channel is allocated 511/512 of the total available bandwidth on the broadband communication link 30. If the FMN bit for a queue channel is set, all of the available bandwidth on the broadband communication link 30 is allocated to the queue channel.

When the ET bit for a queue channel is set, the high and low CLP thresholds for the queue channel determine whether the queue channel accesses spare bandwidth on the broadband communication link 30. Spare bandwidth is defined as transmit intervals on the broadband communication link 30, wherein no enabled queue channel has both credits and outbound communication cells ready for transmission.

The first channel register of the CSE 212 specifies the first queue channel in a service chain. The next channel numbers in the queue service control blocks define the ordering of the queue channels in the service chain. Each next channel number in the queue service control blocks specifies the next queue channel in the service chain. The next channel number corresponding to the last queue channel in the service chain points back to the first queue channel in the service chain.

Each queue channel is in one of three states when the CSE 212 renders a service decision; a no_serve state, a serve_now state, or a serve_ok state. A queue channel is in the no_serve state if both the PIR credits and the MIR credits for the queue channel are cleared. A queue channel is in the serve_now state if the MIR credit for the queue channel is set. The serve_now state is the highest priority state of a queue channel. A queue channel is in the serve_ok state if the PIR credit for the queue channel is set.

A queue channel is in the serve_now state or the serve_ok state only if the queue channel in not empty. An empty queue channel is in the no_serve state. The serve_now state and the serve_ok state are defined by the following Boolean equations:

serve_now=(CM2|CM1|FMN) &!QE serve_ok=(CMX|(TE & ET)|FMX) & !QE where | =Boolean OR, &=Boolean AND, !=Boolean NOT.

Figure 12:
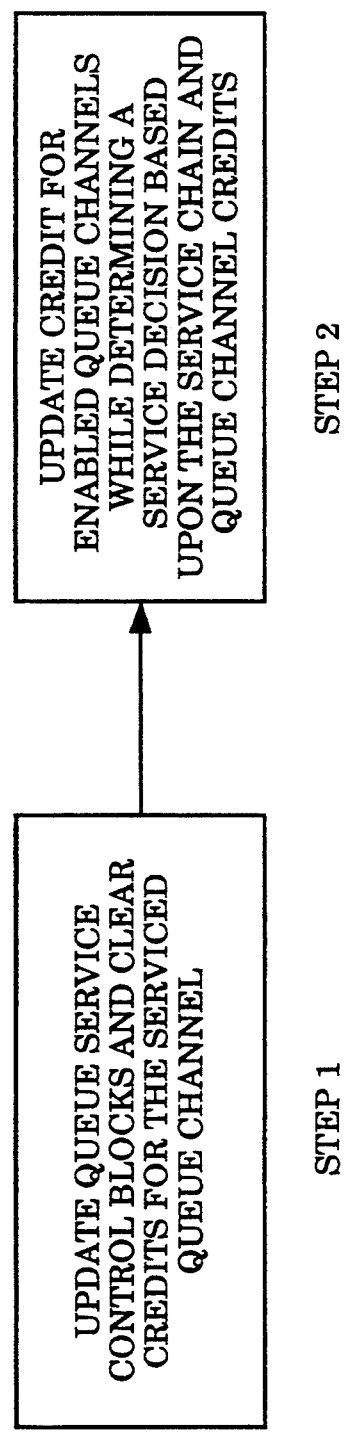
FIG. 12 illustrates a process employed by the CSE to render a service decision for each transfer interval over the broadband communication link.

FIG. 12 illustrates a process employed by the CSE 212 to render a service decision. The CSE 212 renders a service decision for each transfer interval over the broadband communication link 30.

At step 1, the CSE 212 updates the information in the queue service control blocks and clears the credits for the serviced queue channel. The CSE 212 updates the queue service control blocks and clears credits according to cell queue status events received from the CQE 210 over the signal lines 258.

FIG. 13 illustrates the format of a cell queue status event. The queue channel #field of a cell queue status event indicates the cell queue specified by the status event. The E bit indicates that the corresponding cell queue is empty as a result of the last service cycle. The T bit indicates the CLP threshold for the corresponding cell queue has been exceeded.

The CSE 212 receives the cell queue status events during step 1 and accordingly updates the queue service control blocks. The cell queue status events indicate changes in the queue channel queue states (i.e., the queue has gone from not empty->empty, the queue has gone from empty->not empty, the queue depth has gone from <predefined threshold to > =a predefined threshold, and the queue depth has gone from > =a predefined threshold to ≦a predefined threshold). The cell queue status events also indicate whether the last queue channel has been serviced via the S bit. The CSE 212 clears the MIR count for the last queue channel serviced.

In step 2, the CSE 212 scans the service chain while updating the PIR and MIR credits for all of the enabled queue channels while simultaneously rendering a service decision.

The CSE 212 updates the PIR credit for a queue channel by adding the PIR increment value to the PIR count of the queue channel. If the addition of the PIR increment value and the PIR count generates an overflow, then the CSE 212 sets the corresponding CMX bit to indicate a PIR credit. If the addition of the PIR increment value and the PIR count does not generates an overflow, then the CSE 212 stores the sum of the PIR increment value and the PIR count as a new PIR count. If the FMX bit for the queue channel is set, then the queue channel has a PIR credit.

The CSE 212 updates the MIR credits for a queue channel by adding the MIR increment value to the MIR count of the queue channel. If the addition of the MIR increment value and the MIR count generates an overflow, then the CSE 212 sets the corresponding CM1 bit or CM2 bit to indicate PIR credits. The CM1 and CM2 bits enable accumulation of two MIR credits for the queue channel. If the addition of the MIR increment value and the MIR count does not generates an overflow, then the CSE 212 stores the sum of the MIR increment value and the MIR count as a new MIR count. If the FMN bit for the queue channel is set, then the queue channel has an MIR credit.

The CSE 212 renders a service decision while scanning the queue channels in an order defined by the service chain and selecting a queue channel for service. While scanning the service chain, the CSE 212 updates the credits for each queue channel and selects the first queue channel updated into the serve_now state. The CSE 212 stores the selected queue channel number into a next service register.

Spare bandwidth on the communication link 30 is available if no queue channel in the service chain is updated into the serve_now state. The spare bandwidth is allocated to the queue channels according to a round-robin spare bandwidth allocation process. The CSE 212 allocates the spare bandwidth by selecting the first queue channel updated into the serve_ok state that occurs in the service chain after the last serve ok channel.

The CSE 212 performs the round-robin spare bandwidth allocation during the same scan through the service chain as the scan for a queue channel updated into the serve_now state. The CSE 212 modifies the next service register for spare bandwidth allocation only if a queue channel in the serve_now state is not stored in the next service register.

While scanning and updating between the first channel and the last serve ok channel in the service chain, the CSE 212 latches the first queue channel updated into the serve_ok state into the next service register. While scanning and updating the service chain between the last serve ok channel and the last queue channel in the service chain, the CSE 212 latches the first queue channel updated into the serve_ok state into the next service register, thereby overwriting any previously latched queue channel in the next service register. As a consequence, the next service register holds the next queue channel in the serve_ok state that occurs in the service chain after the last serve ok channel.

FIG. 14 illustrates the next service register. The queue channel #field of the next service register stores the current highest priority queue channel selected by the CSE 212 while scanning the service chain.

Bit 8 of the next service register (B) indicates whether the queue channel #field specifies a queue channel in the serve_ok state that occurs before the last serve ok channel in the service chain.

Bit 7 of the next service register (A) indicates whether the queue channel #field specifies a queue channel in the serve_ok state that occurs after the last serve ok channel in the service chain.

Bit 6 of the next service register (N) indicates whether the queue channel #field specifies a queue channel in the serve_now state.

The queue channel #field of the next service register specifies the next queue channel for servicing after the CSE 212 scans the entire service chain.

The CSE 212 maintains a serve_ok_after flag (not shown). The CSE 212 resets the serve_ok_after flag at the beginning of the service chain scan. The CSE 212 sets the serve_ok_after flag when the service chain scan reaches the last serve ok channel.

The CSE 212 sets the queue channel #field to an unused queue channel number at the start of the service chain scan. The CSE 212 updates the next service register only when a higher priority queue channel is scanned.

During the service chain scan, the CSE 212 sets the B bit and writes the current queue channel into the queue channel #field if the B bit is clear and if the serve_ok_after flag is clear and if the current queue channel is in the serve_ok state.

During the service chain scan, the CSE 212 sets the A bit and writes the current queue channel into the queue channel #field if the A bit is clear and if the serve_ok_after flag is set and if the current queue channel is in the serve_ok state.

During the service chain scan, the CSE 212 sets the N bit and writes the current queue channel into the queue channel #field if the N bit is clear and if the current queue channel is in the serve_now state.

After completing the service chain scan, the CSE 212 updates the last serve ok channel register if necessary. The CSE 212 also notifies the COE 210 of the service decision.

FIG. 15 illustrates a set of queue channel configurations for one embodiment. The queue channel configurations comprise a queue channel off configuration, an always serve configuration, an always ok configuration, a guaranteed bandwidth configuration, a guaranteed bandwidth with smoothing configuration, and a minimum bandwidth only with delay limiting configuration.

FIG. 16 illustrates the parameter settings in the queue service control blocks that correspond to the queue channel configurations for one embodiment.

A queue channel is in the channel off configuration if both the corresponding PIR increment value and the corresponding MIR increment value are set to zero. In the channel off configuration, the PIR count and the MIR count cannot generate PIR or MIR credits.

A queue channel is in the always serve configuration if both the corresponding FMN and FMX bits are set. In the always serve configuration, the queue channel always has a credit to send any pending outbound communication cells in the corresponding cell queue.

A queue channel is in the always ok configuration if the corresponding MIR increment value is set to zero and the corresponding FMX bit is set to one. In the always ok configuration, the queue channel transmits an outbound communication cell only if spare bandwidth is available on the broadband communication link 30. The broadband communication link 30 provides spare bandwidth if the sum of the MIR increment values for all of the queue channels is less than 512.

A queue channel is in the guaranteed bandwidth configuration if the corresponding MIR increment value is set to the sum of the committed information rates of the communication services using the queue channel. In addition, the corresponding FMX bit is set to enable burst traffic at the full bandwidth of the broadband communication link 30.

A queue channel is in the guaranteed bandwidth with smoothing configuration if the corresponding MIR increment value is set to the sum of the committed information rates of the communication services using the queue channel, and if the corresponding FMX bit is cleared, and if the corresponding PIR increment value is set to enable burst traffic at less than the available bandwidth on the broadband communication link 30. The PIR increment value is set to prevent burst traffic on variable bit rate channels from propagating through the communication network 200 when one of the BCXs is lightly loaded.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for buffering communication cells in a plurality of queue channels in a communication controller, comprising the steps of:

receiving a first communication cell over a first communication link, the first communication cell specifying a destination queue channel from among a plurality of queue channels, the first communication cell comprising a cell loss priority status;

if the cell loss priority status is in a first state and if a depth of a destination cell queue corresponding to the destination queue channel exceeds a cell loss priority threshold for the destination queue channel, then discarding the first communication cell;

if the cell loss priority status is not in the first state or if the depth of the destination cell queue corresponding to the destination queue channel does not exceed the cell loss priority threshold, then entering the communication cell into the destination cell queue;

updating a set of queue service control parameters for each queue channel in a service chain while determining a next serviced queue channel in the service chain according to the queue service control parameters, the queue service control parameters specifying bandwidth allocation on a second communication link;

accessing a second communication cell from a serviced cell queue specified by the next serviced queue channel, and transferring the second communication cell over the second communication link.

2. The method of claim 1, wherein for each queue channel the queue service control parameters comprise a minimum information rate and a peak information rate.

3. The method of claim 2, wherein the step of updating a set of queue service control parameters for each queue channel further comprises the step of determining a service state for each queue channel, the service state comprising a serve—now state, a serve—ok state, and a no—serve state.

4. The method of claim 3, wherein each queue channel is in the serve—now state if the queue channel must be serviced to maintain the minimum information rate for the queue channel.

5. The method of claim 3, wherein each queue channel is in the serve—ok state if the queue channel can be serviced and not exceed the peak information rate for the queue channel.

6. The method of claim 3, wherein each queue channel is in the no—serve state if the queue channel does not require service to maintain the minimum information rate for the queue channel.

7. The method of claim 3, wherein each queue channel is in the no—serve state if a cell queue corresponding to the queue channel is empty.

8. The method of claim 3, wherein each queue channel is in the serve—ok state if a depth of a cell queue corresponding to the queue channel exceeds a cell loss priority threshold for the queue channel.

9. The method of claim 3, wherein for each queue channel the step of updating a set of queue service control parameters, comprises the steps of:

adding a minimum information rate count to a minimum information rate increment value, the minimum information rate count and the minimum information rate increment value comprising the minimum information rate for the queue channel;

if the addition of the minimum information rate count and the minimum information rate increment value generates an overflow, then setting a minimum information rate credit for the queue channel;

adding a peak information rate count to a peak information rate increment value, the peak information rate count and the peak information rate increment value comprising the peak information rate for the queue channel;

if the addition of the peak information rate count and the peak information rate increment value generates the overflow, then setting a peak information rate credit for the queue channel.

10. The method of claim 9, wherein for each queue channel the step of determining a service state, comprises the steps of:

setting the service state to the serve—now state if the minimum information rate credit is set;

setting the service state to the serve—ok state if the maximum information rate credit set and the minimum information rate credit is not set;

setting the service state to the no—serve state if the maximum information rate credit is not set and if the minimum information rate credit is not set.

11. The method of claim 9 wherein for each queue channel the step of determining a service state, comprises the steps of:

setting the service state to the serve—now state if a force minimum credit flag of the queue service control parameters is set;

setting the service state to the serve—ok state if a force maximum credit flag of the queue service control parameters is set;

setting the service state to the no—serve state if a cell queue corresponding to the queue channel is empty.

12. The method of claim 3, wherein the step of determining a next serviced queue channel in the service chain, comprises the step of searching the service chain in a predefined order specified by the queue service control parameters and selecting the next serviced queue channel as a first queue channel in the service chain found in the serve—now state.

13. The method of claim 3, wherein the step of determining a next serviced queue channel in the service chain, comprises the step of searching the service chain in a predefined order specified by the queue service control parameters and selecting the next serviced queue channel as a first queue channel found in the serve—ok state in the service chain after a last serve ok queue channel if no queue channel in the service chain is in the serve—now state.

14. The method of claim 1, further comprising the step of setting an explicit forward notification status in the second communication cell if a depth of the serviced cell queue exceeds an explicit forward notification threshold.

15. An apparatus for buffering communication cells in a plurality of queue channels in a communication controller, comprising:

circuit for receiving a first communication cell over a first communication link, the first communication cell specifying a destination queue channel from among a plurality of queue channels, the first communication cell comprising a cell loss priority status;

circuit for discarding the first communication cell if the cell loss priority status is in a first state and if a depth of a destination cell queue corresponding to the destination queue channel exceeds a cell loss priority threshold for the destination queue channel;

circuit for entering the communication cell into the destination cell queue if the cell loss priority status is not in the first state or if the depth of the destination cell queue corresponding to the destination queue channel does not exceed the cell loss priority threshold;

circuit for updating a set of queue service control parameters for each queue channel in a service chain while determining a next serviced queue channel in the service chain according to the queue service control parameters, the queue service control parameters specifying bandwidth allocation on a second communication link;

circuit for accessing a second communication cell from a serviced cell queue specified by the next serviced queue channel, and transferring the second communication cell over the second communication link.

16. The apparatus of claim 15, wherein for each queue channel the queue service control parameters comprise a minimum information rate and a peak information rate.

17. The apparatus of claim 16, wherein the circuit for updating a set of queue service control parameters for each queue channel further comprises circuit for determining a service state for each queue channel, the service state comprising a serve—now state, a serve—ok state, and a no—serve state.

18. The apparatus of claim 17, wherein each queue channel is in the serve—now state if the queue channel must be serviced to maintain the minimum information rate for the queue channel.

19. The apparatus of claim 17, wherein each queue channel is in the serve—ok state if the queue channel can be serviced and not exceed the peak information rate for the queue channel.

20. The apparatus of claim 17, wherein each queue channel is in the no—serve state if the queue channel does not require service to maintain the minimum information rate for the queue channel.

21. The apparatus of claim 17, wherein each queue channel is in the no—serve state if a cell queue corresponding to the queue channel is empty.

22. The apparatus of claim 17, wherein each queue channel is in the serve—ok state if a depth of a cell queue corresponding to the queue channel exceeds a cell loss priority threshold for the queue channel.

23. The apparatus of claim 17, wherein for each queue channel the circuit for updating a set of queue service control parameters, comprises:

circuit for adding a minimum information rate count to a minimum information rate increment value, the minimum information rate count and the minimum information rate increment value comprising the minimum information rate for the queue channel;

circuit for setting a minimum information rate credit for the queue channel if the addition of the minimum information rate count and the minimum information rate increment value generates an overflow;

circuit for adding a peak information rate count to a peak information rate increment value, the peak information rate count and the peak information rate increment value comprising the peak information rate for the queue channel;

circuit for setting a peak information rate credit for the queue channel if the addition of the peak information rate count and the peak information rate increment value generates the overflow.

24. The apparatus of claim 23, wherein for each queue channel the circuit for determining a service state, comprises:

circuit for setting the service state to the serve—now state if the minimum information rate credit is set;

circuit for setting the service state to the serve—ok state if the maximum information rate credit set and the minimum information rate credit is not set;

circuit for setting the service state to the no—serve state if the maximum information rate credit is not set and if the minimum information rate credit is not set.

25. The apparatus of claim 23, wherein for each queue channel the circuit for determining a service state, comprises:

circuit for setting the service state to the serve—now state if a force minimum credit flag of the queue service control parameters is set;

circuit for setting the service state to the serve—ok state if a force maximum credit flag of the queue service control parameters is set;

circuit for setting the service state to the no—serve state if a cell queue corresponding to the queue channel is empty.

26. The apparatus of claim 17, wherein the circuit for determining a next serviced queue channel in the service chain, comprises circuit for searching the service chain in a predefined order specified by the queue service control parameters and selecting the next serviced queue channel as a first queue channel in the service chain found in the serve—now state.

27. The apparatus of claim 17, wherein the circuit for determining a next serviced queue channel in the service chain, comprises circuit for searching the service chain in a predefined order specified by the queue service control parameters and selecting the next serviced queue channel as a first queue channel found in the serve—ok state in the service chain after a last serve ok queue channel if no queue channel in the service chain is in the serve—now state.

28. The apparatus of claim 15, further comprising circuit for setting an explicit forward notification status in the second communication cell if a depth of the serviced cell queue exceeds an explicit forward notification threshold.

* * * * *